(12) United States Patent
Gourlaouen et al.

(10) Patent No.: US 8,493,884 B2
(45) Date of Patent: Jul. 23, 2013

(54) MULTI-TOPOLOGY AND MULTI-SERVICE ROUTING SYSTEM

(75) Inventors: Denis Gourlaouen, La Garenne Colombes (FR); Roland Schutz, Gometz le Chatel (FR)

(73) Assignee: Thales, Neuilly sur Seine (FR)

( * ) Notice: Subject to any disclaimer, the term of this patent is extended or adjusted under 35 U.S.C. 154(b) by 798 days.

(21) Appl. No.: 11/720,474

(22) PCT Filed: Nov. 30, 2005

(86) PCT No.: PCT/EP2005/056349
§ 371 (c)(1),
(2), (4) Date: Apr. 11, 2008

(87) PCT Pub. No.: WO2006/052888
PCT Pub. Date: Jun. 8, 2006

(65) Prior Publication Data
US 2008/0304424 A1 Dec. 11, 2008

(30) Foreign Application Priority Data
Nov. 30, 2004 (FR) ..................... 04 12691

(51) Int. Cl.
*H04L 12/28* (2006.01)
(52) U.S. Cl.
USPC ...................................... 370/254
(58) Field of Classification Search
None
See application file for complete search history.

(56) References Cited

U.S. PATENT DOCUMENTS

| 7,433,691 | B1* | 10/2008 | White ......................... 455/445 |
| 2002/0078209 | A1* | 6/2002 | Peng ........................... 709/227 |
| 2003/0105865 | A1 | 6/2003 | McCanne et al. |
| 2003/0235187 | A1* | 12/2003 | Iwama et al. ............... 370/352 |
| 2004/0125802 | A1* | 7/2004 | Lillie et al. .................. 370/390 |
| 2004/0165591 | A1* | 8/2004 | Conte et al. ................. 370/392 |
| 2004/0240445 | A1* | 12/2004 | Shin et al. ................... 370/389 |

FOREIGN PATENT DOCUMENTS

| WO | 00/74312 A | 12/2000 |
| WO | WO 00/74312 | 12/2000 |

OTHER PUBLICATIONS

Xiaohui Gu et al: "QoS-assured service composition in managed service overlay networks" Proceedings of the 23rd International Conference on Distributed Computing Systems. ICDCS 2003. Providence, RI; May 19-22, 2003, ICDCS Los Alamitos, CA : IEEE Comp. Soc. US, vol. CONF. 23, May 19, 2003, pp. 194-201 XP010642287.

Jin, Nahrstedt: "On Construction of Service Multicast Trees" ICC 03 IEEE Conference, vol. 2, May 11, 2003-May 15, 2003 XP002333317.

(Continued)

*Primary Examiner* — Minh-Trang Nguyen
(74) *Attorney, Agent, or Firm* — Lowe Hauptman Ham & Berner, LLP

(57) ABSTRACT

A system and method is disclosed for routing a stream between several nodes, Ni, forming a network. The stream is transmitted by a source and is intended for one or more destinations taking account of the mobility requirements of the users and of the network nodes. The network nodes have the following characteristics: a node, Ni, of the network comprises a service module, xSVi, one or more transfer gateways, xTGi, a function LOC suitable for generating for each service a routing table used at the request of the service modules, xSVi. A server LOC is connected, for a given service, via a service node, SNGi, to the other routing modules LOCi.

4 Claims, 2 Drawing Sheets

OTHER PUBLICATIONS

Figure 1:
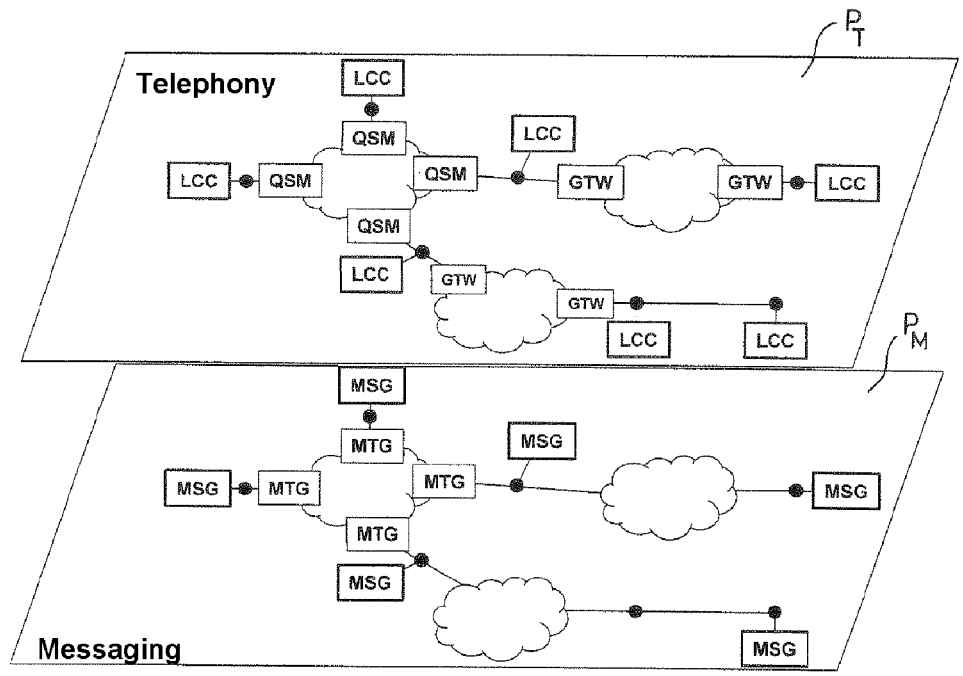

Jingwen Jin et al: "Qos service routing in one-to-one and one-to-many scenarios in next-generation service-oriented networks" Performance, Computing, and Communications, 2004 IEEE International Conference Phoenix, AZ Apr. 15-17, 2004, Piscataway, NJ, USA, IEEE Apr. 15, 2004, pp. 503-510 XP010725635.

* cited by examiner

MULTI-TOPOLOGY AND MULTI-SERVICE ROUTING SYSTEM

CROSS-REFERENCE TO RELATED APPLICATIONS

The present Application is based on International Application No. PCT/EP2005/056349, filed on Nov. 30, 2005, which in turn corresponds to France Application No. 04 12691 filed on Nov. 30, 2004 and priority is hereby claimed under 35 USC §119 based on these applications. Each of these applications are hereby incorporated by reference in their entirety into the present application.

The present invention relates to a multi-topology and multi-service routing system.

The system is developed to operate on various types of transport subnetworks (IP, radio, etc.) and to interconnect the services operating on these subnetworks, in a context of user mobility and of nodes forming the service networks.

Many dynamic routing protocols have been developed in the past for various types of existing switches (circuit switch, packet switch or cells in connected mode, router, etc.). These routing protocols are systematically dedicated to a single network type and form an integral part of the technology developed for a given network. These protocols describe either routing mechanisms within a network, or routing mechanisms between networks of the same kind.

Currently, the developments in this field relate to systems based on multi-topology routing making it possible to instantiate the routing mechanisms of one and the same technology for different topologies, the routing taking account of the quality of service and resource reservations, of the routing over the mobile networks (Adhoc, etc.).

The known routing protocols of the prior art are usually incomplete and do not take account of certain network specifics, such as mobility, optimization of the available resources, etc. Certain studies of the prior art have related notably to the mobility of the network addresses (mobile IP, mobility in IPV6, etc.) and have resulted in solutions requiring the installation of tunnels able to create inefficient stream loops on networks having restricted segments.

Nevertheless, the protocols do not take account of the dynamic routing required at the service level, addressing via one and the same routing protocol various services that may have a different topology. They do not take account of the distribution of a multi-destination stream via a distribution tree generated dynamically in a distributed manner for each stream instance. These mechanisms do not handle the problems of interconnection of services carried over networks of different kinds.

The routing system according to the invention notably handles the mobility of the users and the servers, the distribution of the multi-destination streams via distribution trees generated dynamically according to the distribution list, the location of the users and the instantaneous topology of the carrier networks. It responds notably to the following questions: on which servers can the destinations be reached (user mobility) and how can the call be routed from the source server to the destination server or servers.

The invention relates to a system of routing a stream between several nodes, Ni, comprising a network, the stream being transmitted by a source and being intended for one or more destinations taking account of the mobility requirements of the users and of the network nodes, characterized in that:
 a node, Ni, of the network comprises a service module, xSVi, one or more transfer gateways, xTGi, a function LOC suitable for generating for each service a routing table used at the request of the service modules, xSVi,
 a server LOC is connected, for a given service, via a service node group, SNGi, to the other LOCi.

A function LOC, on routing information received from another LOCi, is for example suitable for:
 determining the real itineraries used to propagate the stream across the network,
 keeping up to date a database of distinct transmittal information for each service.

A function LOCi may contain a location directory in which the user has previously had himself registered, the directory being distributed in each standalone unit of the network.

The invention also relates to a multi-topology and multi-service routing method designed to operate on a transport subnetwork comprising several nodes, Ni, and designed to interconnect the services operating on these networks characterized in that it comprises at least the following steps:
 locating the service users and communicating various items of information: the location of the users present in the network, the accessibility and topology information relating to all the links existing between the service modules xSVi of the various services,
 generating the distribution tree associated with a stream between a source and several destinations taking account of the instantaneous distribution list and topology of the system and of the location of the users.

The method may also comprise the following step:
a service module, xSVi, wishing to route a stream to one or more destinations interrogates a location function suitable for generating for each service a routing table that supplies, for each destination of the stream, the next service xSVi access and relay point.

The routing table supplies for example the pair of xTG to be used to reach this next hop.

The system and the method that are the subjects of the invention notably have the particular feature of operating at service level.

The invention relates notably to the following functions: the handling of the location of the service users and the communication of the location information to all the network nodes, the recognition of the various topologies associated with the presence of the service switching nodes (telephony, messaging, content distribution, etc.), the generation of the route between a source and one or more destinations taking account of the distribution list and of the instantaneous topology of the system, and of the location of the users.

The routing method makes it possible to effectively use networks of which certain main data highways are restricted in bit rate (for example satellite links, very high frequency (VHF) links, ultra high frequency (UHF) links); the distribution list of a content or of a message is taken into account, the content to be distributed will be transferred only once over the restricted data highways.

It defines a routing and location protocol shared by all the services. This has the consequence of avoiding the development of a protocol for each service. By means of this protocol, an end-to-end connectivity is established at the service level via carrier subnetworks of different kinds.

The protocol thus developed offers a management view of connectivity at service level that does not exist in the current implementations.

Figure 2:
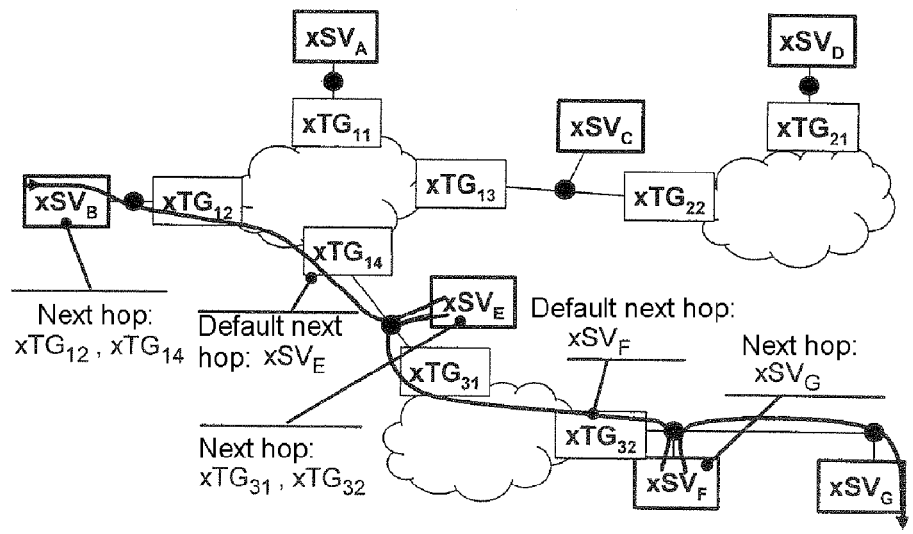
Figure 3:
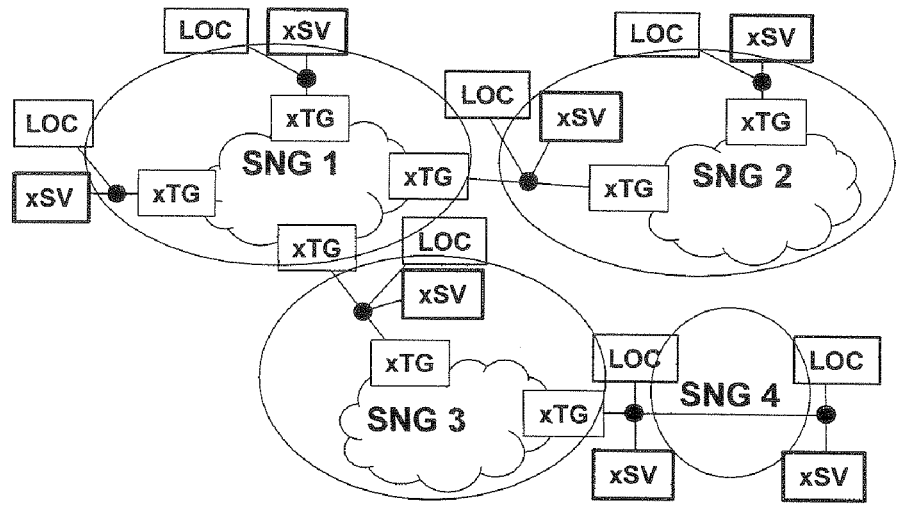
Figure 4:
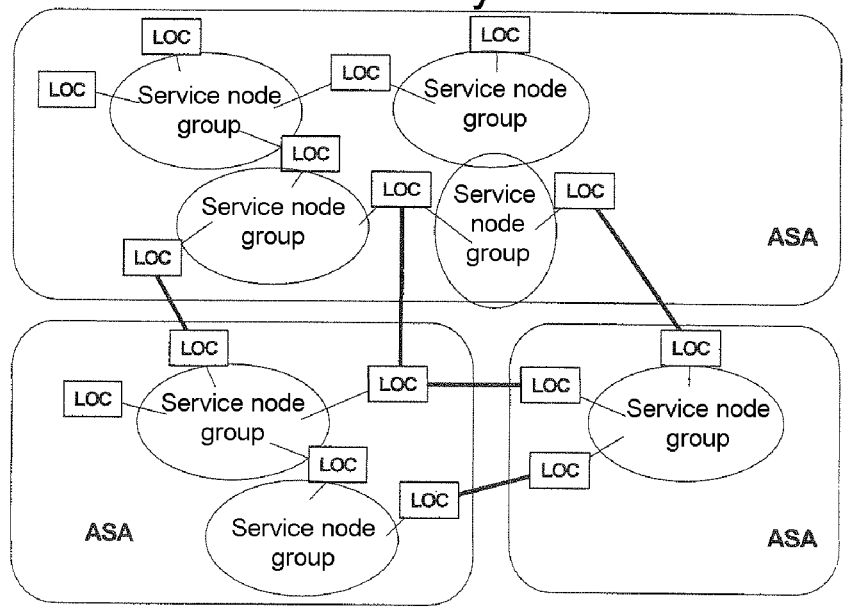

Other features and advantages of the present invention will be more apparent on reading the following description of an appended exemplary embodiment, given for illustration purposes and being in no way limiting, of the figures that represent:

FIG. 1, an example of services having different topologies, for example the telephony service and the messaging service, FIG. 2, an example of the architecture for routing the streams according to the invention, FIG. 3, an example of interconnection of the components LOC via service groups, FIG. 4, an example of a breakdown of a mobility domain.

FIG. 1 shows the difference in interconnection topologies of the service plans that can exist for two given services; for example for the telephony service and for the messaging service. The transfer gateways are specific for a given service.

For telephony, the service plan PT comprises for example several modules LCC having notably the function of controlling the calls and the multimedia, modules GTW having the function of providing the interconnection of the telephony services with the telephony services of other networks, components QSM that handle the management of quality of service on the data highways of the core network. The modules LCC are for example considered to be the application platform for the telephony systems for the purpose of supplying advanced services and telephony.

For messaging, the service plan $P_M$ comprises for example several components MTG having the function of specifying the functional adaptations required for the transport of messages over another network, components MSG in charge of the messaging system.

FIG. 2 schematically represents an example of a system for routing a stream according to the invention between several nodes Ni. The system comprises several service access points and relay points, xSVi, transfer gateways, xTGi allowing the streams to be transferred to be adapted to the capacities of the subnetwork. A module suitable for handling the routing for all of the services, called the LOCi, is associated with each xSVi of the routing system. When a service module, xSVi, wishes to route a stream to one or more destinations (one or more network nodes), it interrogates the local module LOCi associated with the xSVi that supplies the next step or next-hop information (stream routed from xSVB to xSVG) and where necessary the information on the transfer gateways xTG to be used. During each of the requests of the xSV, the function LOC (implemented for example in the form of a component offering services) gives, for each destination of the stream, the next relay hop (xSVi) of the information and the pair of xTG (the first is the entrance gateway to the network traversed and the second is the exit gateway) to be used to reach this next hop.

A module xSV groups together the relaying and access point functions (for example the module xSV can include a mailbox in the case of a messaging function).

The module LOC contains for example a location directory in which the user has previously had himself registered, in this instance the directory is for example distributed in each standalone unit of the network.

To generate the distribution tree associated with a stream between a source and several destinations taking account of the mobility requirements of the users and of the network nodes, the functions LOC (location and routing) interchange the following information: the location of the users present in the network, and accessibility and topology information relating to all the links that exist between the service modules xSV of the various services.

To propagate the information that they have, the servers LOCi are interconnected in the following manner: the servers LOC are interconnected for a given service via an SNG (a group of LOC that are in direct line of sight that represents a given network at service level or a service node group) having notably the function of broadcasting an item of information received by all the LOC connected to this service node group. One and the same server LOC may form part of several SNG. An item of information transmitted by a server LOC in a SNG is received by all the LOC connected to this SNG.

FIG. 3 schematically represents an example of the organization of the network interconnection into a service node group "SNG", shown in FIG. 2.

The information thus propagated by the SNG allows each connected component LOC to generate, for a given service, the information routing table that is used by the requests transmitted by the service modules xSV. This is carried out by means of known algorithms, for example of the Distance Vector or Link State type.

The invention is used for example for putting in place a domain structure making it possible to limit the number of items of routing information interchanged and to control the incoming and outgoing streams of a given network.

Such a structure has notably the advantage of defining the field of mobility of the users and the zones in which the servers or access point xSV can move.

A user mobility domain consists for example of various network types (infrastructure network, high bit rate radio network, low bit rate radio network, etc.) or of networks controlled by different government authorities. These networks in fact constitute autonomous service areas or ASA.

FIG. 4 represents an example of the breakdown of a mobility domain, on which the service users can move in several autonomous service areas ASA. An assembly of service relays or access points (xSV) may be moved with the LOC function that is attached to them without causing any reconfiguration by administration within an ASA.

The LOC interconnected by SNG form an autonomous service area ASA, within which the functions LOC can move with the xSV that are attached to them. The accessibilities and the topology within one and the same area ASA are known to all the LOC of one and the same ASA. The connections between ASA do not propagate the accessibilities internal to the ASA, but propagate to the adjacent areas ASA only the accessibility of the ASA and accordingly limit the volume of routing information interchanged over the network. These solutions are similar to those developed for packet networks, but they have been applied to the topologies formed by networks at the interconnection level of the servers supplying the service.

An external network is considered to be an autonomous service area "ASA" by the routing system according to the invention.

The exemplary embodiments described above address the dynamic management of the topologies formed by service networks. They address the networks on which a distributed management of mobility is required (mobility of the service nodes and mobility of the service users).

The invention applies notably to the networks of which certain main data highways are restricted in bit rate (satellite, microwave, Adhoc network data highways, etc.), because it makes it possible to take account of the distribution list of a content or of a message and makes it possible to ensure that the content to be distributed will be transferred only once over the restricted data highways.

The invention also makes it possible to create an end-to-end connectivity for the service, even if the carrier subnetworks are of different kinds.

The invention claimed is:

1. A multi-topology and multi-service routing system for routing a stream between several nodes, Ni, said routing system comprising a network, the stream being transmitted from one source to one destination, or one source to several destinations, taking account of mobility requirements of users and of the network nodes, wherein a node, Ni, of the network comprises a service module including service access points and relay points, xSVi, one or more transfer gateways, xTGi, allowing the streams to be transferred to capacities of a subnetwork, and a module LOC or LOCi comprising a function LOC or LOCi for handling the routing for all services and adapted for generating for each said service a routing table used at the request of the service modules, xSVi, and wherein the function LOC or LOCi is connected, for a given service, via a service node group, SNGi, to the other routing modules LOC or LOCi, said module LOC or LOCi being associated with each xSVi, said service node group, SNGi, being suitable for broadcasting information received by all the modules LOC or LOCi connected to said service node group, said xSVi is configured for interrogating the module LOCi associated with the xSVi, and said module LOC is configured for interchanging information including: location information of the users present in the network, and accessibility and topology information relating to all links that exist between service modules xSV of various services, in order to generate a distribution tree associated with a stream between a source and several destinations taking account of the mobility requirements of the users and of the network nodes.

2. The routing system as claimed in claim 1, wherein the function LOC, on routing information received from the module LOCi, is configured to:

determine real itineraries used to propagate the stream across the network, update a database of distinct transmittal information for each service.

3. The routing system as claimed in claim 1, wherein one of the modules LOC or LOCi includes a location directory in which the user has previously had himself registered, the directory being distributed in each standalone unit of the network.

4. The routing system as claimed in claim 1, wherein the service modules xSV each groups relaying and access point functions together.

* * * * *